3,142,116
METHOD OF WELDING SILICON STEEL
Sadayoshi Morita and Teiji Ito, Yawata, and Arinobu Yamada, Tobata, Japan, assignors to Yawata Iron & Steel Co., Ltd., Tokyo, Japan, a corporation of Japan
No Drawing. Filed Apr. 9, 1962, Ser. No. 185,870
Claims priority, application Japan Apr. 14, 1961
2 Claims. (Cl. 29—480)

The present invention relates to a method of welding silicon steel strip in making silicon steel plate for electromagnetic materials.

In making silicon steel plate 0.5 mm. thick or under at present, a manufacturing process is sometimes used where the silicon strips about 1.0 mm. thick are welded together and then subjected to cold rolling. In such welding, a tungsten inert-gas arc welding process has usually been adopted using an ordinary tungsten electrode and because of the steel plate being too thin the so-called "non filler metal process" has been used without using a welding rod. The weld metal portion melted by welding heat in the welding method currently in use shows conspicuous development of columnar crystals, particularly when the metal plate, which has a ferrite structure even in a high temperature range, is concerned, and in such case the structure of the weld metal portion tends to become very coarse and in consequence often liable to cause breakage at the weld metal portion in cold rolling process subsequent to welding.

The first characteristic feature of the present invention comprises using, as a welding rod, mild steel core wire low in silicon content for minimizing the silicon content of weld metal portion in order to prevent the same from becoming coarse and to minimize the risk of breakage liable to occur at the weld metal portion. By using a mild steel welding rod of chemical composition as shown in Table 1, the silicon content of the weld metal portion is minimized as much as possible and its structure is austenitized at higher temperature and the structure of the weld metal portion can be made pearlite or a mixture of pearlite and ferrite of columnar crystal in the finest possible crystal grains.

If the carbon content of the welding rod and core wire used in this welding method exceeds 0.2% as shown in Table 1, the structure of the weld steel tends to become martensite, harder and more brittle owing to relatively faster cooling at the weld part. And also, the border part tends to grow an anomalous structure of SiC and particularly mechanical properties such as flexural strength and elongation deteriorate. Furthermore, the lower its silicon content is, the more fine-grained becomes the structure of the weld steel and the mechanical properties such as elongation and toughness are improved.

*Table 1*

| | C | Mn | Si | P | S | Fe |
|---|---|---|---|---|---|---|
| Chemical composition of welding rod (percent) | <0.2 | <2.0 | <0.03 | <0.03 | <0.03 | remainder. |

The second characteristic feature of the present invention comprises cutting with a grinder or other suitable means the surplus thickness of the metal plate welded by using welding rod down to a thickness slightly in excess of the normal thickness of the plate and then levelling it off smooth by rolling.

In the so-called "non filler metal welding process," the surplus thickness is so small because of the welding rod being not used, that the weld plate can be rolled without going through a scraping process, but the weld portion tends to become unshapely compared with the base metal and is liable to become a cause of breakage of steel strip owing to an instantaneous impact being added to the weld metal portion at the time of rolling.

In welding by the method of this invention, the weld metal portion will have a greater surplus thickness because of the welding rod being used compared with the weld metal portion obtained by the so-called "non filler metal process," but the chemical composition of the weld metal portion, which is almost the same as that of mild steel, will present no problem in processes such as scraping, grinding and rolling. And such weld metal portion, ground to a thickness equal to or slightly in excess, even 115% for example, of the thickness of the base plates, can be made substantially equal in thickness to that of the base plate by rolling and trimmed free from any surface defects preventing thus impact on the weld metal portion which is likely to occur at the time of rolling and in consequence the risk of breakage is completely eliminated. If the weld metal portion is less than 115% of the base plates in thickness, it can be made level and smooth only by rolling without going through a scraping process.

The third characteristic feature of this invention comprises the process in which a weld metal portion ground or scraped down to a thickness equal to that of the base metal after welding is subjected to rolling by means of upper and lower rotary plate rolls while applying an appropriate voltage between the rolls and directly supplying electric current to and heating the said weld metal portion to a suitable temperature as stated below with results of homogenizing the structures of the weld metal portion and its adjoining area and properly trimming the weld metal portion. That is to say, even when a welding rod was used, the weld metal portion has a columnar structure remaining after welding, and the weld metal portion is liable to break on account of lack of sufficient strength to endure the external force of impact at the time of cold rolling. But, by directly supplying electric current to and rolling the weld metal portion its columnar structure was homogenized and standardized, particularly improving elongation and toughness of the weld metal portion so that it retained sufficient strength to endure external force at the time of cold rolling.

As stated above, the third characteristic feature of this invention lies in destroying and finely granulating austenite grains, etc. at the weld metal portion at high temperature and the rolling force must be selected according to the thickness of the plate. As the thickness of plate increases, rolling force must be increased.

For example, the following relation between rolling force and plate thickness must exist when the plate is finely granulated uniformly as far as its interior:

| Plate thickness | Rolling force (total pressure applied), kg. |
|---|---|
| 0.5 mm | 1,000 |
| 1.0 mm | 1,500 |
| 2.5 mm | 3,000 |

It is necessary to apply rolling force while heating in the austenite region up to a temperature in excess of the A3 transformation point, not only by direct electric heating, but also by any appropriate means such as gas fire, high-frequency heating, etc.

The diameter, wall thickness and material of the rotary plate roll are subject to some alteration according to thickness and quality, etc. of the welded plate, but in the case of a steel roll it should be more than 500 HV in hardness of the peripheral face, more than 200 mm. in diameter, and more than 13 mm. in wall thicknees, of which particularly the wall thicknes should be properly selected in accordance with the width of the weld bead. Table 2 below shows the comparative results of welding experiments on the cold rolled silicon steel strips 0.7 mm. thick obtained by using a conventional method and the method of this invention, such as the difference in welding conditions and breakage rates of the weld metal portion at the time of cold-rolling.

As clearly seen in this table, the welding by the invention method shows remarkably improved results in which the rate of breakage is reduced to nothing.

*Table 2*

| Welding condition | Welding current (Amp) | Welding voltage (volt) | Welding rate (cm./min.) | Argon Flow (l./min.) | Diameter of welding rod (mm.φ) | Feeding rate of the rod (cm./min.) |
|---|---|---|---|---|---|---|
| Conventional method used | 45 | 11-12 | 90 | 10 | | |
| Method under this invention | 80 | 12-13 | 90 | 12 | 0.81 | 84 |

| Condition of electric rolling process | Width of rotary plate roll (mm.) | Diameter of rotary plate roll (mm.φ) | Rolling pressure (kg.) | Traveling rate of roll (cm./min.) | Temperature at electric rolling (° C.) |
|---|---|---|---|---|---|
| Conventional method | | | | | |
| Method of this invention used | 13 | 200 | 1,500 | 90 | 870-920 |

RATE OF PASSING OF THE PLATE FOR COLD ROLLING

| | Width of coil (mm.) | Number of plates welded | Number of plates passed | Number of breakage | Rate of passing of plate for rolling (percent) |
|---|---|---|---|---|---|
| Conventional method | 760-790 | 16 | 13 | 3 | 81.3 |
| Method of this invention | 760-790 | 20 | 20 | 0 | 100 |

CHEMICAL COMPOSITION OF WELDING ROD USED IN THE WELDING EXPERIMENT (PERCENT)

| C | Mn | Si | P | S | Fe |
|---|---|---|---|---|---|
| 0.08 | 0.25 | 0.03 | 0.03 | 0.03 | Remainder. |

The third characteristic feature of this invention as above mentioned has been verified from experiments to show very valuable results when the plates are of greater thickness and also when the welding is made by an inert-gas arc welding method or by a submerged arc welding method. That is, as the plate increases in thickness, the chemical composition of the weld metal by M.I.G. method or by submerged arc welding method will be influenced less by the base material than that of the weld metal made by the T.I.G. method using a welding rod, and will resemble the composition of the welding core wire used, thereby making the first characteristic feature of this invention display its advantage. However, even in this case elongation and toughness of the weld metal portion will be still further improved, if the process of electric rolling is adopted.

Referring to Table 3 showing the experiment results of welding cold rolled silicon steel plates 1.8 mm. thick, it will be realized that by adopting the process of rolling with electric power supplied, the elongation of the weld portion is greatly improved and by using the method of this invention such an excellent welding of silicon steel strips will be achieved that they can easily endure cold rolling.

*Table 3*

| Welding condition | Welding current used (Amp) | Welding voltage used (Volt) | Rate of welding (cm./min.) | Argon flow (l./min.) | Flux | Diameter of core wire (mm. φ) |
|---|---|---|---|---|---|---|
| MIG welding | 125-205 | 26-28 | 110-120 | 10 | | 1.6. |
| Submerged arc welding | 260 | 23 | 200 | | Grade 55 mesh 12 x 150. | 2.4. |
| Condition of rolling with electr. supplying. | Roll width (mm.). | Roll diam. (mm. φ). | Rolling Pressure (kg.). | | Roll travel rate (cm./min.). | Temperature used in process of rolling with electr. supplying (° C.). |
| Conventional method used | | | | | | |
| Method of this invention | 13 | 200 | 1,500 | | 70 | 880-930. |

| Mechanical properties of weld portion | Elongation (percent) | Repeating bending test value 5R |
|---|---|---|
| Base material | 1.0 | 0.75 |
| MIG welding: | | |
| Untreated | 4.0 | 2.5 |
| Treated under this invention | 12.2 | 7.5 |
| Submerged arc welding process: | | |
| Untreated | 4.5 | 3.0 |
| Treated under this invention | 13.5 | 8.4 |

| Chemical composition of core wire used | C | Mn | Si | P | S | Sol. Al | Insol. Al |
|---|---|---|---|---|---|---|---|
| For MIG welding | 0.147 | 0.33 | 0.01 | 0.06 | 0.015 | 0.003 | 0.006 |
| For Submerged arc welding | 0.08 | 0.25 | 0.03 | 0.03 | 0.03 | 0.002 | 0.005 |

What we claim is:

1. A method of welding silicon steel plate comprising the steps of welding silicon steel plates by using a mild steel welding rod containing below 0.2% C and below 0.03% Si, leveling off and trimming the surplus thickness and then subjecting the welded portion and its adjoining region to roll press while heating it at a temperature in excess of the A3 transformation point but below the solidus point.

2. A method as claimed in claim 1, in which the weld portion and its adjoining region are roll pressed while being heated up to said temperature by directly supplying electric current thereto.

References Cited in the file of this patent

UNITED STATES PATENTS

| | | |
|---|---|---|
| 1,623,249 | Kahn | Apr. 5, 1927 |
| 1,718,746 | Longheed | June 25, 1929 |
| 2,176,602 | Beck et al. | Oct. 17, 1939 |
| 2,231,014 | Lytle et al. | Feb. 11, 1941 |
| 2,817,981 | Brownell | Dec. 31, 1957 |